3,121,046
PRESSURE VESSELS
Kenneth A. Trickett, San Diego, Calif., and James T. Rogers, Jr., Peterborough, Ontario, Canada, assignors, by mesne assignments, to the United States of America as represented by the United States Atomic Energy Commission
Filed Nov. 16, 1961, Ser. No. 153,270
3 Claims. (Cl. 176—52)

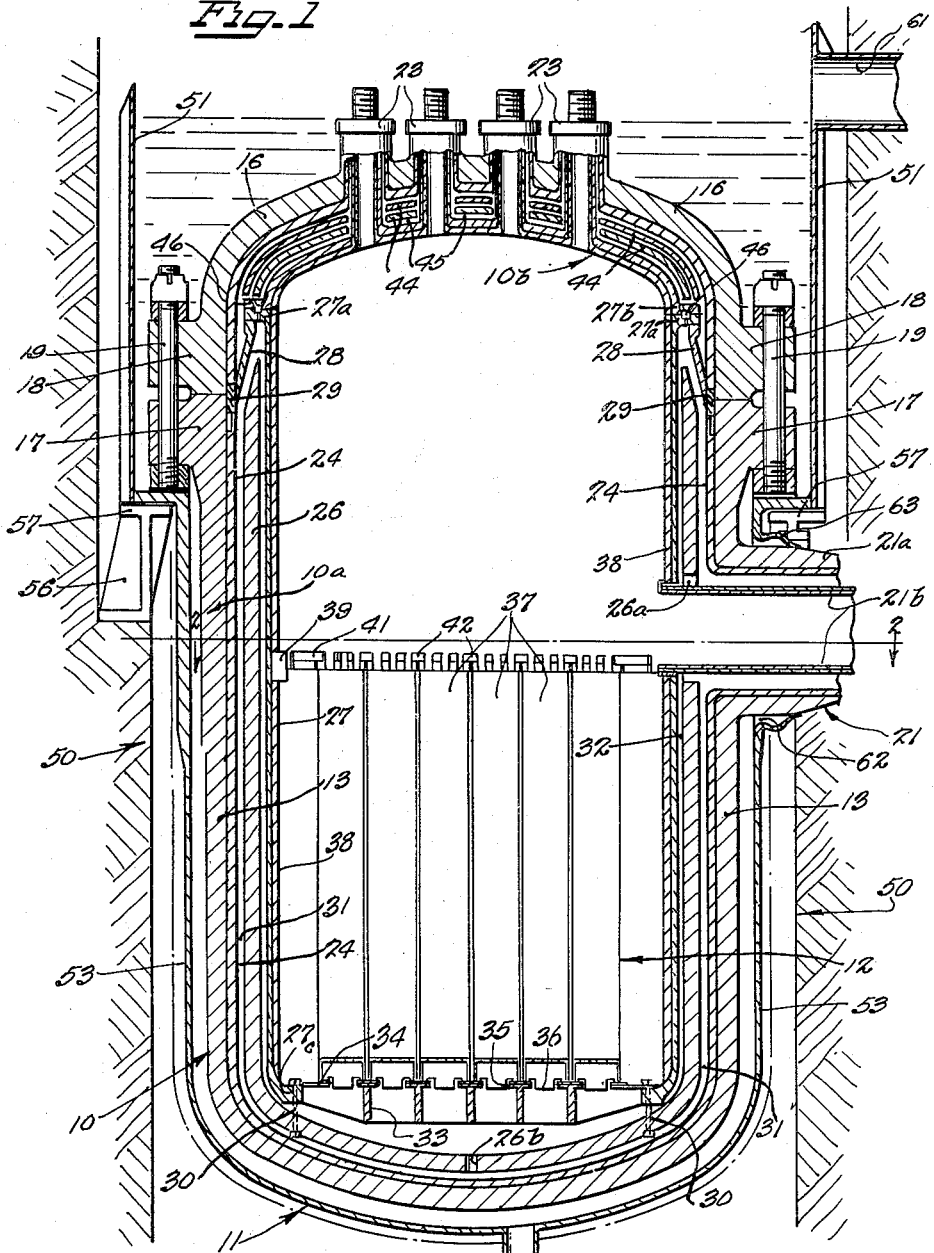

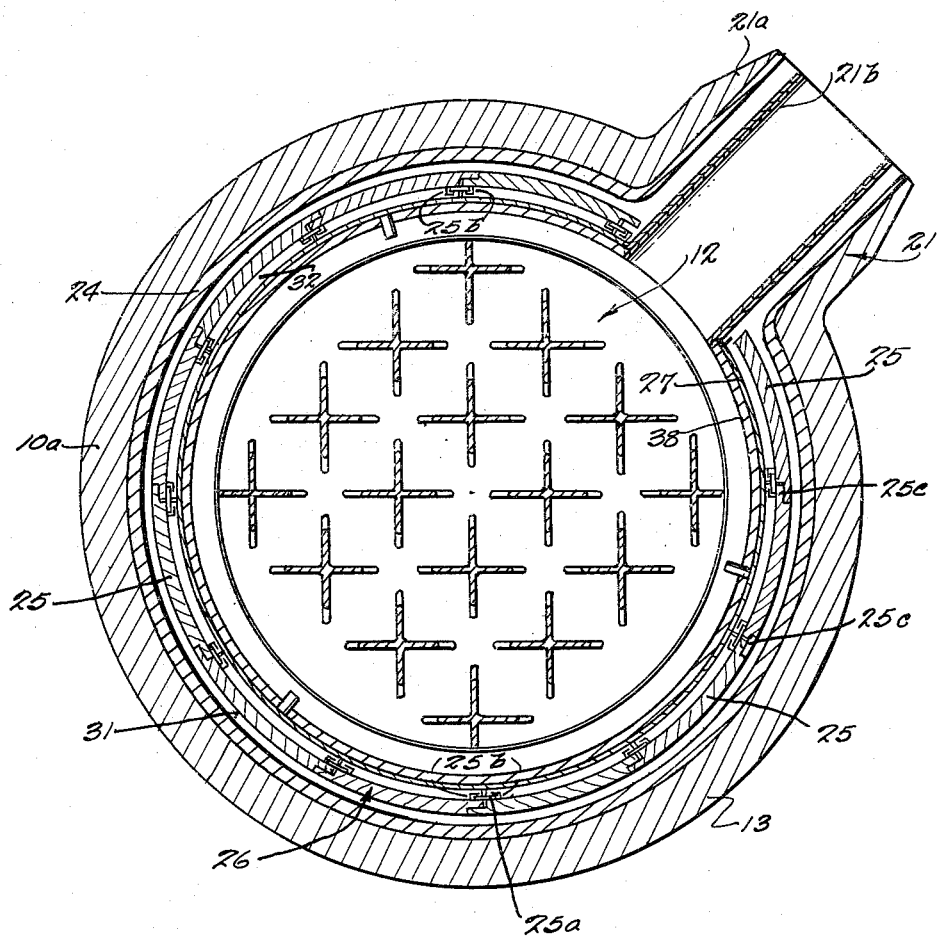

This invention relates to pressure vessels and more particularly to an internally insulated and externally cooled pressure vessel for a gas-cooled neutronic reactor.

In a closed-cycle gas turbine system, thermodynamic efficiency is achieved through high temperature and high pressure. When a gas cooled neutronic reactor is incorporated in a closed-cycle system, it is desirable that reactor inlet and outlet temperatures approach values of approximately 800° F. and 1400° F., respectively. In such a system, the use of inlet gases for regenerative cooling of the pressure vessel containing the reactor could be employed; however, cooling of this nature imposes certain restrictions on the total system. For example, depending upon reactor diameter and system pressure, the required wall thickness for high temperature operations approaches economic fabrication limits. In addition, when inlet gases are used in a regenerative cooling cycle, outlet temperatures can only be marginally increased because of the corresponding increase in inlet gas temperature.

An alternate method of cooling a pressure vessel containing a reactor core would be the utilization of a separate cooling system. In this instance, low temperature system gas could be withdrawn from a location between the high pressure turbine and regenerative components of the system. However, this method is inherently disadvantageous inasmuch as it reduces the overall thermodynamic efficiency of the system, when the cooling gas is returned to the system.

It is a prime object of the present invention to provide an improved internally insulated and externally cooled pressure vessel for a gas cooled neutronic reactor which is designed and fabricated so that the thermodynamic efficiency of a closed-cycle system including the reactor is enhanced.

A further object of the present invention resides in the provision of an internally insulated and externally cooled pressure vessel, the design temperature of which vessel can then be reduced to below approximately 650° F. thereby permitting the use of carbon or low alloy steel in the fabrication thereof, while at the same time yielding a high reactor outlet gas temperature.

Still another object of the present invention resides in the provision of a pressure vessel which is externally cooled and which is provided with internal insulation that precludes rapid temperature changes in the inside surface of the vessel relative to the outer surface, thereby eliminating shocking and resulting cumulative fatigue damage.

An additional object of the present invention resides in the provision of an internally insulated and externally cooled pressure vessel, which advantageously provides a more stable temperature distribution between the various components of the pressure vessel structure.

A further object of the present invention resides in the provision of an externally cooled pressure vessel provided with internal insulation of a form which will minimize contamination of the coolant by radiation particles held up in the system and can efficiently withstand rapid reactor depressurization, which is an important power control feature.

Other objects and advantages of the present invention become apparent from the following description when considered in conjunction with the accompanying drawings wherein:

FIGURE 1 is a vertical cross-sectional view of a preferred embodiment of an internally insulated and externally cooled pressure vessel of the type contemplated by the present invention; and, FIGURE 2 is a cross-sectional view taken along the line 2—2 in FIGURE 1.

A preferred embodiment of an internally insulated and externally cooled pressure vessel contemplated by the present invention includes a pressure resistant housing having a layer of insulation provided along the inner surface thereof. Mounting means are secured to and extend radially inwardly from at least a portion of the insulated inner surface of the housing. A thermal barrier is supported within the housing by the mounting means in concentric spaced relation with the insulated inner surface of the vessel, and a thermal shield is mounted on the thermal barrier and situated in concentric relation between the barrier and the housing so that a plurality of communicating coolant channels or passageways are defined therebetween. Means are provided which communicate with the housing and effect the introduction of a coolant gas thereto. The coolant entering the housing circulates through the channels to within the region defined by the thermal barrier. The entire pressure resistant housing is disposed within a coolant tank which is filled with a suitable coolant. The coolant within the tank is circulated about the entire outer surface of the housing during the circulation of the coolant gas within the channels defined adjacent the insulated inner surface of the housing so that efficient heat extraction from the interior surface of the housing with a corresponding high outlet temperature can be realized, while at the same time the design temperature of the housing can be limited to a value substantially below this outlet temperature.

Referring now in particular to FIGURE 1, there is disclosed an internally insulated pressure vessel generally designated by the numeral 10 which is suitably mounted within an external coolant tank 11. The pressure vessel 10 contains a neutronic reactor core 12, which constitutes one component of a closed-cycle, gas turbine system (not shown) that circulates a coolant medium through the core 12 and effects the production of useful power from the heat extracted therefrom. In accordance with the provisions of the present invention, the pressure vessel 10 is constructed and the core 12 disposed therein so that cooling of the vessel and heat extraction from the core can be readily effected, while at the same time achieving maximum thermodynamic efficiency in the closed-cycle system.

The pressure vessel 10 includes a main cylindrical pressure resistant housing 10a having a wall 13 of predetermined thickness. The inner surface of the wall 13 is provided with suitable insulation, which will hereinafter be described in detail. A head portion 10b constitutes the second major component of the vessel 10 and includes a dome-shaped cover 16 that is also provided with insulation adjacent the inner surface thereof. The cylindrical pressure vessel wall 13 is provided with a flange 17 near the upper extremity thereof. Similarly, a flange 18 is formed about the lower portion of the dome-shaped cover 16, which flange is proportioned to mate with the flange 17. The cover 16 is secured to the main pressure vessel wall 13 in pressure tight relation by a plurality of bolts or studs 19 that extend through and are tightened against the flanges 17 and 18.

As illustrated in FIGURES 1 and 2, the main cylindrical pressure vessel wall 13 is proportioned with a projection 21 that includes an inlet nozzle 21a and an outlet nozzle 21b. The nozzles 21a and 21b are designed to communicate with a concentric ducting arrangement (not shown) that functions to carry a coolant gas to and from the core of the neutronic reactor disposed within the vessel 10. One type of concentric ducting arrangement that could be suitably adapted for use with the pressure vessel 10 is disclosed and claimed in a copending application assigned to the Atomic Energy Commission, Serial No. 765,545, filed October 6, 1958. The dome-shaped cover 16 is also provided with a plurality of flanged nozzles 23 which accommodate suitable means (not shown) that function to effect desired actuation of a plurality of control rods or other instrumentalities associated with the reactor core 12.

The inner surfaces of the cylindrical wall 13 and the cover 16 are each provided with a layer of insulation 24 which also extends along the inner surfaces of nozzles 21a, 21b, and 23. Mounted in concentric spaced relation to the insulated inner surface of the wall 13 is a thermal shield 26, which functions to attenuate the heat producing radiations from the reactor core 12. The thermal shield 26 is supported by a cylindrical thermal barrier 27, which has a flanged upper portion 27a that is fixedly attached to the inner wall of the flange 17 by means of a cone shaped support ring 28 and an annular support ring 29. The support ring 29 which serves as the mounting means for the cone shaped support ring 28 and in turn for the lower flanged portion of the thermal barrier 27 is fixedly secured to the flange 17 and extends around a portion of the inner surface thereof. The upper dome-shaped portion of the thermal barrier 27 is provided with a flange 27b which mates with the flange 27a so that the upper portion of the thermal shield 26 is also supported by the rings 28 and 29.

By referring to FIGURES 1 and 2, the manner in which the thermal shield is constructed and mounted relative to the thermal barrier 27 and the insulated inner surface of the pressure vessel wall 13 will best be understood. The thermal shield 26, which has the upper extremity thereof beveled to complement the cone shaped configuration of the supporting ring 28, is secured near the lower extremity thereof to the lower portion of the thermal barrier 27 by means of a plurality of bolts or studs 30. The thermal shield 26 is mounted so that a coolant channel or gas flow passageway 31 of uniform width is provided between the layer of insulation 24 and the outer surface of the shield. Similarly, the thermal shield 26 is mounted relative to the thermal barrier 27 so that a coolant channel 32 is provided between these two concentric members.

As depicted in FIGURE 2, the continuous cylindrical thermal shield 26 is constructed of a number of arcuate shaped plates 25. The plates are formed to mate with adjacent plates 25 and are secured together to form a unitary structure by a plurality of diagrammatically illustrated dove-tailed supporting members 25a which extend from the outer surface of the thermal barrier 27 and are fitted within a plurality of guide flanges 25b that extend from the inner surface of each of the individual plates 25. The T-shaped dove-tailed supporting members extend across the coolant channel or gas flow passageway 32; however, these members are arranged so that circulation of coolant within this channel is not obstructed. The arrangement of the members 25a and the flanges 25b not only serves to retain the shield 26 in a unitary configuration, but also insures that radial expansion of the member can occur. In this connection, it can be seen that the individual arcuate shaped plates 25 are provided with suitably flanged edge portions 25c that are proportioned to overlap and mate with the flanged portions of the plates which are secured adjacent thereto.

The gas flow passageways 31 and 32 communicate with each other above the beveled extremity of the thermal shield 26, through an aperture 26a that is provided in one portion of the side wall of the thermal shield to receive the nozzle 21b, and through an aperture 26b provided in the lower extremity of the shield 26. Accordingly, a coolant gas being circulated through the inlet nozzle 21a passes through the passageways 31 and 32 and, after blending, circulates up through the reactor core 12. During circulation of the coolant through the reactor core 12, heat is extracted from the core thus substantially raising the temperature of the coolant which is thereafter passed through the outlet nozzle 21b and circulated through the closed-cycle gas turbine system.

The lower portion of the thermal barrier 27 to which the studs 30 are fixedly secured not only serves as the mounting means for the thermal shield 26 but also functions to support the neutronic reactor core 12 within the vessel 10. In this connection, the bottom extremity of the thermal barrier 27 adjacent the location of the studs 30 is provided with an annular lip or flange 27c on which a rigid core support grid 33 and a support plate 34 are mounted. The support plate 34 is provided with a plurality of sleeved openings 35 which receive plenum chambers 36 of a plurality of diagrammatically illustrated core modules 37.

Extending upwardly from the lower extremity of the thermal barrier 27 and along the inner surface of the upper portion thereof is an additional layer or liner of insulation 38. The liner of insulation 38 is provided with an annular recess near the upper extremity of the core modules 37 so that a support ring 39, which is secured to the inner wall of the thermal barrier 27, can extend therethrough. The ring 39 serves to support a plurality of individual abutting plates 41, which are keyed thereto in a conventional manner and which function to preclude horizontal movement of the core modules. In addition to the abutting plates 41 which are keyed to the support ring 39, an additional number of abutting plates 42 are positioned in cooperative relationship with the upper extremities of the individual core modules 37 so that radial motion of the modules is precluded, while vertical motion due to thermal expansion is permitted.

The construction of the inner portion of the vessel adjacent the dome like cover 16 is somewhat different than the formation of the thermal shield, barrier, and layer of insulation provided in concentric spaced relation along the inner surface of the vessel wall 13 of the lower portion 10a. As illustrated in FIGURE 1, the layer of insulation 38 provided on the inner surface of the thermal barrier 27 extends upwardly and forms a dome like cover in a manner similar to the layer of insulation 24 provided on the inner surface of the wall 13. Situated between the extensions of the layers 24 and 37 are a plurality of dome shaped, spaced apart layers of insulation 44 between which are provided a number of passages 45 which communicate with the passageways 31 and 32 through an opening 46 in the flanged portions 27a and 27b of the thermal barrier.

As previously described, the entire vessel is disposed within the reactor coolant tank 11 that is in turn mounted within a shielding and reinforcing structure 50. The confines of the tank 11 are defined by a cylindrical upper wall section 51 that extends above a position adjacent the vessel flanges 17 and 18 and by a cylindrical lower wall section 53 which extends downwardly from a position beneath the flange 17. A portion of the structure 50 which encompasses the wall sections 51 and 53 accommodates a reactor support skirt 56 of a conventional type that functions as the mounting means for the vessel and the tank. More particularly, the support skirt 56 is structurally adapted with a support ring 57 which provides the primary support for the vessel 10 and which is preferably constructed so that radial movement of the vessel as a result of thermal expansion is permitted. One suitable support structure which embodies the requisite structural and functional features of the ring 57 is disclosed and claimed in the copending application of the common assignee, Serial No. 148,771, which was filed on Oct. 30, 1961.

As illustrated in FIGURE 1, an inlet nozzle 59 is provided at the lowermost extremity of the coolant tank 11. The nozzle 59 communicates with a suitable source (not shown) of a fluid coolant such as (but not limited to) water or heat transfer oils. The coolant is fed through the tank about the entire exterior surface of the pressure vessel 10. An outlet nozzle 61 is provided in the upper cylindrical wall section 51 wherethrough coolant exiting from the tank is passed. As shown, the outlet nozzle 61 is positioned within the wall 51 at a location just above the upper extremity of each of the nozzles 23. Still another portion of the tank 11 is provided with an aperture 62 that accommodates the concentric nozzle arrangement 21a—21b of the pressure vessel 10. A suitable bellows member 63 is provided adjacent the aperture 62 and is suitably fitted about a portion of the outer circumferential surface of the inlet nozzle 21a. With this arrangement, radial expansion of the concentric nozzle arrangement in conjunction with the pressure vessel 10 is accommodated, while at the same time insuring that the liquid coolant does not escape from the tank. These structural features of the tank 11 effect the maintenance of a level of liquid coolant with the tank so that the entire outer surface of the pressure vessel 10 is immersed therein.

During normal operation of the neutronic reactor disposed within the pressure vessel, the external coolant tank 11 is filled, and coolant is continually circulated about the outer wall of the pressure vessel while at the same time being maintained at the aforedescribed level. A low temperature gas is concomitantly circulated to the pressure vessel 10 through the inlet nozzle 21a that communicates with the outer duct of the concentric ducting arrangement (not shown). Upon entering the vessel through the nozzle 21a, the gas moves upwardly and downwardly through channels 31 and 32 and, after blending, passes to a location just below the support plate 34. Thereafter, the gas flows upwardly through the individual module plenum chambers 36 whereat the flow is divided and continues around fuel elements (not shown) contained in the modules. The final phase of gas circulation within the pressure vessel is from a location adjacent the upper extremity of the reactor core 12 and through the outlet nozzle 21b which communicates with the inner duct of the concentric ducting arrangement.

A specific embodiment of an internally insulated, externally cooled pressure vessel incorporating the principal features of the present invention could, of course, be constructed for particular applications, which may or may not call for minor modifications in certain of the structural features previously described. The following dimensional details are illustrative of one form of construction which is adapted to efficiently function in conjunction with a closed-cycle gas turbine system. More particularly, the vessel 10 is constructed with an outside diameter of approximately 10 feet and a height of approximately 20 feet, as measured from the base of the cylindrical housing 10a to the upper extremity of each of the nozzles 23. The inlet nozzle 21a has an inside diameter of approximately 27 inches, while the inside diameter of the outlet nozzle 21b is approximately 18 inches.

Assuming a design temperature of approximately 650° F., the wall 13 is preferably fabricated of carbon or low alloy steel plating approximately 4½ inches thick. The layer 24 provided on the inner surface of the vessel 10 is in the form of a metallic insulation having a thickness of approximately 2 inches. The thermal shield 26, which is disposed in concentric spaced relation to the insulated inner wall of the vessel, has a thickness of approximately 4 inches and is constructed of a material such as low carbon steel. The thermal barrier 27 has a thickness of approximately 1 inch, and the layer 38 of insulation provided on the inner surface thereof has a thickness of approximately 2 inches and is of the same material as the layer of insulation 24, i.e., stainless steel. The thermal shield 26 and thermal barrier 27 is mounted so that the gas flow passageways or coolant channels 31 and 32 are approximately 1¾ inches in width. The walls 51 and 53 of the coolant tank 11 have an overall thickness of approximately 1 inch and have a 2 inch layer of insulation on the external surfaces thereof. The liquid coolant circulated within the tank 11 is preferably an organic coolant, such as heat transfer oils; however, air or water might also be satisfactorily utilized. Similarly, a variety of gas coolants could be utilized to effect heat extraction from the reactor core 12 and in this connection, a coolant such as helium or carbon dioxide would be preferable.

It should be understood that the foregoing description is merely illustrative of one embodiment of a pressure vessel which incorporates the features of the present invention. Modifications in the structural features of this vessel could be made without departing from the spirit and scope of the invention as set forth in the following claims.

We claim:

1. An internally insulated and externally cooled pressure vessel for containing and supporting core assembly components of a gas cooled neutronic reactor, which comprises a cylindrical pressure resistant housing having a layer of insulation along the inner surface thereof; mounting means including a cone-shaped ring of thin cross-sectional dimension with the larger diameter end secured to the inner surface of said housing with the tapering smaller diameter end extending radially inwardly from at least a portion of the insulated inner surface of said housing; a thermal barrier supported by the smaller inner end of said cone-shaped ring within said housing by said mounting means in concentric spaced relation with the insulated inner surface thereof, said thermal barrier including means for mounting said nuclear reactor core assembly components within the interior thereof; a thermal shield mounted on said thermal barrier and situated in concentric spaced relation between said barrier and said housing and defining communicating annular passageways in cooperation with said housing and said thermal barrier; means communicating with said housing to effect the introduction of a coolant gas through said passageways to pass through a nuclear reactor core assembly mounted within the region defined by said thermal barrier; and means for circulating a coolant medium about the exterior surface of said housing during the introduction of the gas coolant through said passageways.

2. An internally insulated and externally cooled pressure vessel for containing and supporting core assembly components of a gas cooled neutronic reactor, which vessel comprises an outer closed generally cylindrical pressure-resistant housing; mounting means including a cone shaped ring having the smaller diameter end extending radially inwardly from the point of attachment of the larger diameter end thereof to at least a portion of the inner surface of said housing; a cylindrical thermal barrier supported by said mounting means within said housing in concentric spaced relation thereto, said thermal barrier including means for mounting and confining said reactor core assembly within the region of said vessel defined by said barrier; a thermal shield mounted by attachment to lower portions of said thermal barrier and situated in concentric spaced relation between said barrier and said housing and defining communicating channels with respect to said housing and barrier, said barrier and shield being apertured in the lower regions communicating said channels to provide a coolant circulation path to a reactor core enclosed within said barrier; means communicating with said housing to effect the introduction of coolant gas to the channels of said coolant circulation path to flow through said reactor core and to exit from said housing; and means for circulating a coolant medium about the exterior surface of said housing during circulation of the gas coolant therein to minimize thermal stresses induced in said housing.

3. In a gas cooled neutronic reactor installation, the combination comprising a pressure resistant housing including a lower elongated cylindrical body and an upper domed flanged cover joined thereto, said housing being provided with a continuous interior insulation lining; mounting means including a thin cross section cone-shaped ring member supported at the larger end by said housing in the region of juncture of said cover and body portions with the smaller end projecting upwardly into said cover portion; an internally insulated cylindrical coextensive thermal barrier supported by said smaller end of said cone-shaped ring member in concentric spaced relation within said housing; a nuclear reactor core assembly mounted within the lower portion of said thermal barrier; a segmented thermal shield mounted by attachment to lower portions of said thermal barrier and supported in spaced concentric relation between said barrier and housing and defining therewith channels communicating at the upper end, said barrier and shield being apertured in lower regions, whereby said channels communicate with coolant passages of said reactor core; inlet nozzle means provided in said housing and communicating with the upper communicating regions of said channels and outlet nozzle means communicating with the upper interior of said thermal barrier, whereby a gas coolant may be circulated successively through said channels, said core and exteriorly, of said housing; and external coolant tank means arranged about at least the body portion of said housing for circulating a separate coolant medium to cool said housing and thereby minimize thermal stresses induced therein.

References Cited in the file of this patent
UNITED STATES PATENTS

| | | |
|---|---|---|
| 2,215,532 | Richardson | Sept. 24, 1940 |
| 2,636,991 | Postell | Apr. 28, 1953 |
| 2,714,577 | Fermi et al. | Aug. 2, 1955 |
| 2,975,118 | Tognoni | Mar. 14, 1961 |

OTHER REFERENCES

Proceedings of the Second United Nations International Conference on the Peaceful Uses of Atomic Energy, Geneva, 1958, volume 9, part 2, pp. 138–142.